United States Patent
Zhang et al.

(10) Patent No.: US 10,346,245 B2
(45) Date of Patent: Jul. 9, 2019

(54) DATA STORAGE SYSTEM AND DATA STORAGE METHOD

(71) Applicant: Tsinghua University, Beijing (CN)

(72) Inventors: Guangyan Zhang, Beijing (CN); Weimin Zheng, Beijing (CN)

(73) Assignee: Tsinghua University, Beijing (CN)

( * ) Notice: Subject to any disclaimer, the term of this patent is extended or adjusted under 35 U.S.C. 154(b) by 283 days.

(21) Appl. No.: 15/533,924

(22) PCT Filed: Dec. 9, 2014

(86) PCT No.: PCT/CN2014/093320
§ 371 (c)(1),
(2) Date: Jun. 7, 2017

(87) PCT Pub. No.: WO2016/090541
PCT Pub. Date: Jun. 16, 2016

(65) Prior Publication Data
US 2017/0337107 A1    Nov. 23, 2017

(51) Int. Cl.
*G06F 11/10* (2006.01)
*G06F 3/06* (2006.01)

(52) U.S. Cl.
CPC .......... *G06F 11/1076* (2013.01); *G06F 3/064* (2013.01); *G06F 3/0619* (2013.01); *G06F 3/0689* (2013.01)

(58) Field of Classification Search
CPC ............. G06F 3/0689; G06F 2212/262; G06F 3/0685; G06F 3/064; G06F 3/0683; G06F 11/1076; G06F 3/0619
See application file for complete search history.

(56) References Cited

U.S. PATENT DOCUMENTS

| | | | |
|---|---|---|---|
| 7,761,736 B2* | 7/2010 | Nguyen | G06F 11/1076 711/114 |
| 8,495,469 B2* | 7/2013 | Bakke | G06F 11/1076 711/114 |

(Continued)

FOREIGN PATENT DOCUMENTS

| CN | 102982122 A | 3/2013 |
|---|---|---|
| CN | 103713973 A | 4/2014 |

OTHER PUBLICATIONS

International Search Report for PCT/CN2014/093320 dated Aug. 31, 2015.

*Primary Examiner* — Phung M Chung
(74) *Attorney, Agent, or Firm* — Olive Law Group, PLLC

(57) ABSTRACT

The data storage system and the data storage approach based on redundant arrays of independent disks (RAID) is provided. The storage system includes: an RAID controller, and a storage device subsystem. This storage device subsystem includes a plurality of first physical storage devices for data storage and a plurality of second physical storage devices for parity storage. First physical storage devices are divided into a plurality of sets of first disks which are independent from each other. The data accesses to different sets of first disks will not interfere with each other. These second disks are shared by all the sets of first disks. The RAID controller stores data in each set of first disks and stores parity information in multiple shared second disks by the RAID mechanism. The storage system combines the parity from different RAID volumes into one shared set and this improves the performance and reliability of the whole storage system.

20 Claims, 7 Drawing Sheets

(56) References Cited

U.S. PATENT DOCUMENTS

| | | | |
|---|---|---|---|
| 8,719,619 B2* | 5/2014 | Li | G06F 11/1092 |
| | | | 714/6.22 |
| 8,832,363 B1* | 9/2014 | Sundaram | G06F 11/108 |
| | | | 711/103 |
| 2001/0044879 A1* | 11/2001 | Moulton | G06F 3/0617 |
| | | | 711/114 |
| 2012/0297272 A1 | 11/2012 | Bakke et al. | |
| 2015/0350322 A1* | 12/2015 | Akaike | G06F 3/0629 |
| | | | 707/827 |
| 2016/0188487 A1* | 6/2016 | Fekete | G06F 12/1009 |
| | | | 711/114 |

* cited by examiner

DATA STORAGE SYSTEM AND DATA STORAGE METHOD

CROSS REFERENCE TO RELATED APPLICATION

This application is a 35 USC 371 application of International PCT Patent Application No. PCT/CN2014/093320, filed on Dec. 9, 2014; the content of which is hereby incorporated by reference herein in its entirety.

FIELD OF THE INVENTION

This invention overall involves data storage method, more specifically, involves the data storage system and data storage method which combine two different kinds of physical storage devices.

BACKGROUND OF THE INVENTION

Redundant Array of Independent Disks (abbr. RAID) is the most widely used approach in the storage field to improve the system reliability, which configures multiple physical storage devices with a certain algorithm and uses as a single, high-performance, reliable virtual volume, e.g., configuring two hard disks into RAID-1, configuring four or five disks into RAID-4, RAID-5 and RAID-6.

RAID controller is used to manage physical storage array and enables it to work as a logical unit, and protect the data on the physical storage array. The system can view the logical drives via RAID controller without need of managing them directly. The functionality of RAID controller can be implemented as either hardware or software. In a typical disk array, as the connection device between the host bus adapters and the hard disks, an RAID controller supports fast computation and input/output (I/O), and provides advanced management functionality including caching and extensibility.

RAID was first proposed in 1988. In recent years, the world has witnessed RAID becoming a multibillion-dollar industry. Researches on RAIDs usually focus on how to design and optimize an individual RAID volume. In practice, however, an RAID controller can enable up to hundreds of physical devices to work simultaneously and manage dozens of logical volumes for various applications. In this situation, a set of storage devices (most of them are homogeneous) will form a single RAID and work together as a volume. Different volumes have different sets of disks, which work independently from each other. Although volume-level management simplifies RAID management and provides performance and fault isolation, it neglects the potential for system-wide optimization.

There exist various kinds of storage devices, such as traditional Hard Disk Drive (abbr. HDD) and flash-based Solid State Disk (abbr. SSD). In recent years, several potential devices (e.g., memristor) are also developed. With different implementation mechanisms, these types of storage devices have their own feature from the perspective of technology and economics. For instance, compared to other devices, HDD has larger capacity as well as relatively lower price, but its performance of random reads and writes is poor. SSD has faster random read speed, smaller volume, higher price, and yet the erase-before-write and wear-out issues. Some technologies of mixing different types of storage devices are already proposed. However, they are usually restricted to optimizing an individual RAID.

As Flash-based SSDs continue to gain popularity in enterprise data centers, it is not uncommon to see an RAID controller with a mix of hard disks and SSDs, where a virtual volume may span over a set of hard disks and SSDs. Although an RAID of SSDs is able to deliver high IOPS (Input/Output Operations per Second), researchers have demonstrated that applying RAID algorithms onto SSDs directly cannot make full use of the performance characteristics of SSDs, and therefore have proposed some RAID algorithms specially designed for SSDs. However, those RAID algorithms are still restricted to optimizing an individual RAID. Furthermore, compared to an RAID made up of hard disks, an SSD RAID has much smaller storage capacity and higher price. In addition, due to the erase-before-write and wear-out issues in SSDs, it is more likely that failure occurs in multiple logical volumes in an enterprise disk array, which serves I/O requests from different types of applications.

In traditional storage systems, accessing parity information in an individual RAID usually becomes the performance bottleneck of storage systems. Therefore, in storage systems, especially in enterprise data centers, addressing the performance bottleneck problem of parity accesses in an individual RAID volume, without addition of any extra hardware I/O resources, is one key challenge.

SUMMARY OF THE INVENTION

With regard to the aforementioned situation, this invention is proposed.

According to one aspect of this invention, a data storage system based on Redundant array of individual disks, RAID, is presented. The storage system includes: an RAID controller, and a storage device subsystem. This storage device subsystem includes a plurality of first physical storage devices for data storage and a plurality of second physical storage devices for parity storage. First physical storage devices for data storage are divided into a plurality of sets of first physical storage devices which are independent from each other. The data accesses to different sets of first physical storage devices will not interfere with each other. The capability of these second physical storage devices for parity storage are shared by all the sets of first physical storage devices. Namely, second physical storage devices are able to store all the parity information of data on any one set of first physical storage devices. The RAID controller stores data in each set of first physical storage devices and stores parity information in multiple shared second physical storage devices by the RAID mechanism.

In the embodiment of the invention, this data storage system combines parity disks from different RAID volumes into one shared set. In other words, a parity disk is not monopolized by only one given RAID volume, but is shared by multiple or all RAID volumes. Therefore, the performance and the reliability of the storage system are enhanced.

In the data storage system implemented according to the invention, the parity information can be written into second physical storage devices in the form of log writes. This consequently enhances the write performance of second physical storage devices.

In the data storage system implemented according to the invention, parity information of one or more stripes from one or more sets of first physical storage devices can be written in parallel into individual second physical storage devices in the form of log writes. This consequently enhances the write performance of second physical storage devices further.

In the data storage system implemented according to the invention, individual second physical storage devices can be written parity information sequentially. This consequently enhances the write performance of second physical storage devices further.

The data storage system implemented according to the invention may also include a storage cache, configured to buffer user data, parity information, and layout metadata about data layout. The array controller consists of an I/O director, a parity calculator, and a data re-constructor. Herein, the second physical storage devices will not be read unless one failure occurs in either first physical storage devices or second physical storage devices. In this way, random reads from the second physical storage devices can be reduced, and consequently the bottleneck of accessing parity information can be avoided.

In an instance of the data storage system implemented according to the invention, when one of first physical storage devices and/or second physical storage devices fails and thus the system reads the second physical storage devices, those read operations are sequential. Such sequential read operation can improve the read performance of second physical storage devices.

In an instance of the data storage system implemented according to the invention, when one of first physical storage devices and/or second physical storage devices fails, the data reconstructor builds an inverted list for each one of second physical storage devices, according to the parity mapping list of the corresponding set of first physical storage devices. Each item in this inverted list correlates the address of a parity block on the second physical storage device with the address of the corresponding data block. Items in this inverted list are sorted by the addresses of parity blocks on the second physical storage device, enabling read or write operations for data recovery on the second physical storage device to be performed sequentially. In this way, during the course of data recovery, the system performs sequential reads or writes on the second physical storage device, which improves the I/O performance of second physical storage device significantly, improves the data recovery speed, and avoids or reduces the impact of data recovery to application I/O performance.

In an instance of the data storage system implemented according to the invention, the aforementioned parity mapping list and inverted list can be stored in the storage cache.

From another aspect of this invention, the inventor provides a data storage method based on the RAID mechanism, including: an RAID controller; several SSD disks for storing data blocks, and several HDD disks for storing parity information. All the SSDs are divided into multiple SSD sets that are independent from one another, and data accesses to different SSD sets do not interfere one another. Every HDD is shared by all the SSD sets and can store the parity information of data in each SSD set. Thus, the RAID controller store data in each SSD and stores parity information in multiple shared HDDs, in the RAID mechanism.

With this storage approach, the negative influence of frequent parity updates to the lifetime of SSDs in a traditional SSD RAID is eliminated.

In addition, the storage system and storage approach implemented according to this invention enables multiple RAIDs to share the parity disk set in a manner of statistical time-division multiplexing.

Because it rarely happens that all the RAIDs bear write-intensive workloads simultaneously, the storage system and storage approach implemented according to this invention eliminate the possibility which parity accesses become the performance bottleneck of the system.

In an instance of the data storage system implemented according to the invention, Parity information can be written sequentially into each HDD in the form of parallel log writes when storing or updating data. Such sequential write can enhance the write performance of HDDs significantly.

The data storage method implemented according to the invention also includes: when one of SSDs and/or HDDs fails, it builds an inverted list for each HDD according to the parity mapping list of the corresponding set of SSDs, each item in this inverted list correlates the address of a parity block on the HDD with the address of the corresponding data block, Items in this inverted list are sorted by the addresses of parity blocks on the HDD; Recovering the failed SSD and/or HDD based on the inverted list for an HDD includes reading parity information from HDD according to the inverted list for the HDD.

The data storage method implemented according to the invention first builds an inverted list for each HDD storing parity information (Items in this inverted list are sorted by the addresses of parity blocks on the HDD), then can sequentially read from HDDs according to the order, thus improving the read performance of HDD greatly, avoiding the performance bottleneck of random reads on HDD, and further enhancing the speed of data recovery.

From another aspect of this invention, the inventor provides an RAID controller which is used with storage subsystem. The storage subsystem consists of multiple first physical storage devices for storing data and multiple second physical storage devices for storing parity information of data. The RAID controller executes the following strategy. All the first physical storage devices for storing data are divided into multiple sets of physical storage devices that are independent from one another, and data accesses to different sets of first physical storage devices do not interfere one another. The capability in storing parity information of multiple second physical storage devices is shared by all the sets of first physical storage devices and can store the parity information of data in any one set of first physical storage devices. In addition, the RAID controller store data in each set of first physical storage devices and stores parity information in multiple shared second physical storage devices, in the RAID mechanism.

The RAID controller implemented according to the invention can also configured to execute the following control strategies. When one of first physical storage devices and/or second physical storage devices fails, it builds an inverted list for each one of second physical storage devices, according to the parity mapping list of the corresponding set of first physical storage devices. Each item in this inverted list correlates the address of a parity block on the second physical storage device with the address of the corresponding data block. Items in this inverted list are sorted by the addresses of parity blocks on the second physical storage device, enabling read or write operations for data recovery on the second physical storage device to be performed sequentially.

The RAID controller implemented according to the invention can also configured to execute the following control strategies. Parity information of one or more stripes from one or more sets of first physical storage devices can be written sequentially into individual second physical storage devices in the form of log writes in parallel.

BRIEF DESCRIPTION OF THE DRAWINGS

From the following detailed description of the invention instance with the figures, these and other aspects of advantages of this invention can be more clear and comprehensive, herein.

DETAILED DESCRIPTION OF THE EMBODIMENTS

Figure 1:
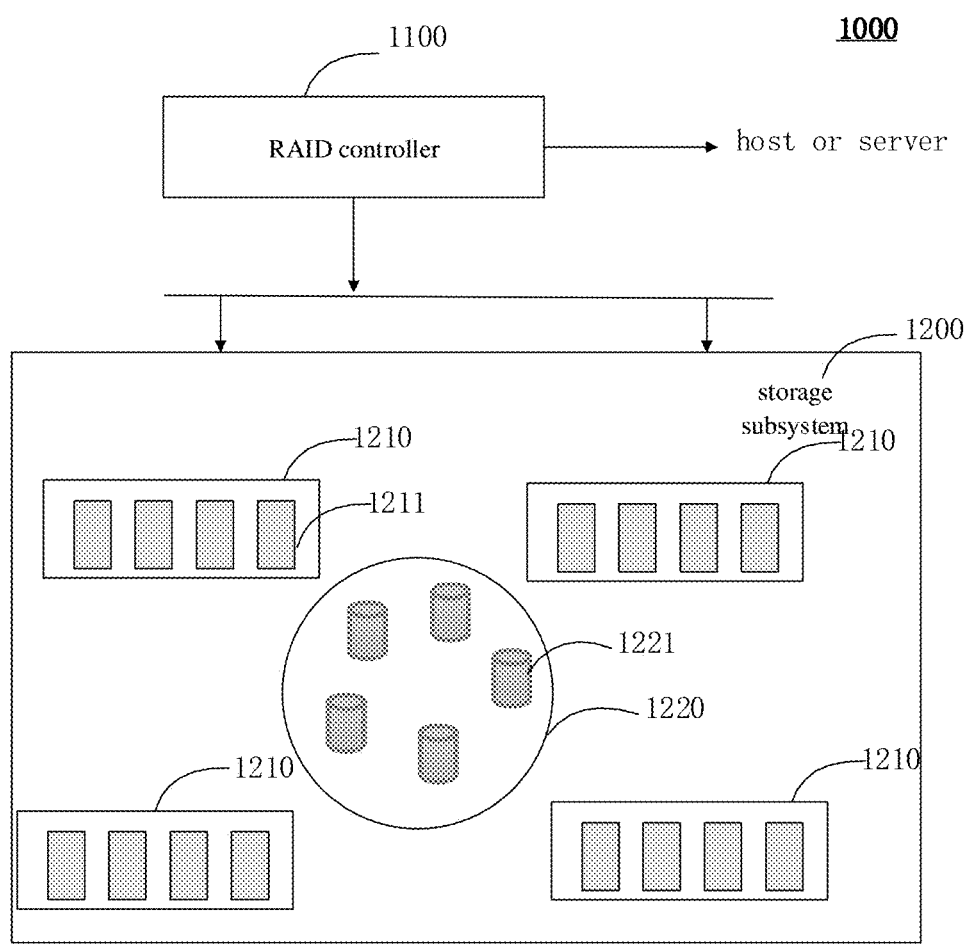
FIG. 1 is the diagram of data storage system 1000 based on the RAID mechanism, implemented according to this invention.

To make technicians in the field better understand the invention, in the following, we show detailed description of the invention along with the figures and the specific way of implementation.

Hereinafter, RAID-4 will be taken as an example of RAID level. In RAID-4, a RAID scheme is made up of N data disks and one parity disk. User data is divided into chunks, and is scattered across N data disks in form of stripes. Sectors of parity disks contains the bitwise XOR data derived from corresponding sectors of each data disk, which guarantees the data reliability in case any disk fails. Note that RAID-4 is only an example of RAID, any RAID scheme satisfying the separation of data disks and parity disks can be applied to the invention. Moreover, other data protection schemes that may emerge in the future can be applied to the invention as long as they store data and parity separately.

The term "parity mapping list" mentioned in this document means a list indicating the mapping relationship between data address and parity address. From the perspective of data storage device, the physical address of corresponding parity information can be found by taking advantage of parity mapping list according to the data address. The term "log list" mentioned in this document is viewed from the perspective of parity storage devices. The "log list" means a list which consists of entries related to only particular parity storage devices in the parity mapping list. Because in a preferred embodiment entries in the log list are sorted in chronological order, which reflects the parity writes and updates resulting from data writes and updates in chronological order, therefore it is called "log list" to distinguish from aforementioned "parity mapping list". The term "inverted list", contrasted with "log list", means a list taking address in parity storage devices as primary key.

Hereinafter, example using SSDs and HDDs as physical storage devices will be taken to illustrate the data storage system and data storage method implemented according to the invention. But the invention is limited to this, it can be applied to other kinds of physical storage devices.

Before detailing the overall technical scheme and embodiment of the invention, the motivation and main idea of the present invention will be briefly described as following for the convenience of those skilled in the art to better understand the invention.

One of the main ideas of embodiment of the invention is to put parity disks from different RAID volumes into one shared set. In other words, a parity disk is no longer monopolized by one RAID volume but shared by many or all RAID volumes, so as to enhance both the reliability and performance of the storage system.

To better understand the I/O pattern of parity blocks under workloads in a standard data center server, the inventor repeated block-level access trace from Microsoft Research in a group of traditional RAID volumes. About the access trace from Microsoft Research, the following literature can be referred to: Dushyanth Narayanan, Austin Donnelly, and Antony Rowstron. Write Off-Loading: Practical Power Management for Enterprise Storage. In Proceedings of the 6rd USENIX Conference on File and Storage Technologies (FAST'08), Pp. 253-267, San Jose, Calif., February 2008. Through the analysis of the parity access model inside the RAID, the inventor observed the following rules:

1) For multiple volumes in a disk array, parity disks in different volumes receive parity requests with completely different intensities and distributions. In a volume, access to parity may become the performance bottleneck, whereas in other volumes parity disks are almost idle.
2) In all volumes, volumes with busy parity disks are in minority, while volumes with almost idle parity disks are in majority. Statistically, less than 20% volumes receive over 80% requests of the total IOPS.
3) The IOPS of total parity in all the volumes tends to be steady, and the IOPS of total parity is not large.

Therefore, the inventor thought, instead of each volume having its own parity disk, multiple volumes can share multiple parity disks so that volumes under write-intensive workload share parity disks with volumes under read-intensive workload or volumes which are idle, so as to balance the workload of parity access among multiple volumes well and avoid the case that some parity disks are overload while others have low resource utilization, so that the problem which parity access in a traditional single RAID become performance bottleneck can be addressed or alleviated.

FIG. 1 is the diagram of data storage system 1000 based on the RAID mechanism, implemented according to this invention.

As illustrated in FIG. 1, data storage system 1000 can consist of RAID controller 1100 and storage subsystem 1200.

The storage subsystem 1200 can consist of multiple sets of first physical storage devices 1210 which store data and multiple sets of second physical storage devices 1220 which store parity. Each set of first physical storage devices 1210 consists of multiple first physical storage devices 1211 for data storage and each set of second physical storage devices 1220 consists of multiple second physical storage devices 1221 for parity storage.

In other words, multiple first physical storage devices 1211 for data storage are divided into several sets of first physical storage devices 1210. Each set of first physical storage devices 1210 is independent of other sets 1210 thus there is no interference in data access between different sets of first physical storage devices 1210.

The parity storage capacity of multiple second physical storage devices 1221 are shared by all the sets of first physical storage devices 1210, and multiple second physical storage devices 1221 can store the parity of any physical storage sets 1210.

Hereinafter, for convenience of description, sometimes the set of first physical storage devices can be called data volume or data disk group while the set of second physical storage devices can be called parity volume or parity disk group.

The first physical storage device 1211 and second physical storage device 1221 can be either the same type of storage device or not, but preferably the first physical storage device 1211 and the second physical storage device 1221 are the different kinds of storage devices. More preferably, the first physical storage device 1211 is better than second physical storage device 1221 on the performance of average access time.

In an instance, the first physical storage device is SSD while the second physical storage device is HDD.

Note that 4 sets of first physical storage devices 1210 and 1 set of second physical storage devices 1220 are shown in FIG. 1, but only as an example. More sets of first physical storage devices 1210 can be deployed such as 5 or 6 or more, or less sets of first physical storage devices 1210 can be deployed such as 2 or three sets. Similarly, more sets of second physical storage device 1220 can be deployed such as 2 or 3 or more. Preferably, a default number of sets of first physical storage devices share a set of second physical storage devices. For example, some 4 SSD sets share a HDD set, another 5 SSD sets share another one HDD set, and so forth.

In FIG. 1, there are 4 sets of first physical storage devices 1210 and one set of second physical storage devices 1220. But it is only an example. More sets of first physical storage devices 1210 can be deployed like 5 or 6 or more, or less sets of first physical storage devices 1210 can be deployed such as 2 or 3. Similarly, more sets of second physical storage devices 1220 can be deployed such as 2 or 3.

In an instance, the set of second physical storage devices 1220 is built by RAID mechanism. Take RAID-4 mechanism as one example to protect the parity in the set of second physical storage devices 1220. For instance, the first physical storage device is SSD while the second physical storage device is HDD. An HDD sets contains 5 HDD disks, among which 4 HDDs are used to store the parity of each SDD set while the other one stores the parity of above 4 HHDs, in other words, to protect the parity of SSDs. Therefore, if any HDD fails, data in that HDD can be recovered through RAID mechanism of HDD sets.

In an instance, the parity is written into the second physical storage devices in form of log writes. Like journaling file system, when updating the new data, the system can simply invalidate the origin data instead of covering it, so as to speed up the parity writes. Preferably, parity in one or more stripes from one or more specific sets of first physical storage devices can be written into each second physical storage device in the form of parallel log writes. More preferably, parity is written into each second physical storage devices in form of sequential writes. This form of writes is well fit for the second physical storage devices which have poor performance for random writes. For example, in the case that the second physical storage device is HDD, as is known to all, since the seeking in HDDs is mechanical, the speed of random I/O is significantly lower than the speed of sequential I/O. Therefore, the form of sequential writes can significantly enhance the I/O performance of HDDs.

Figure 2:
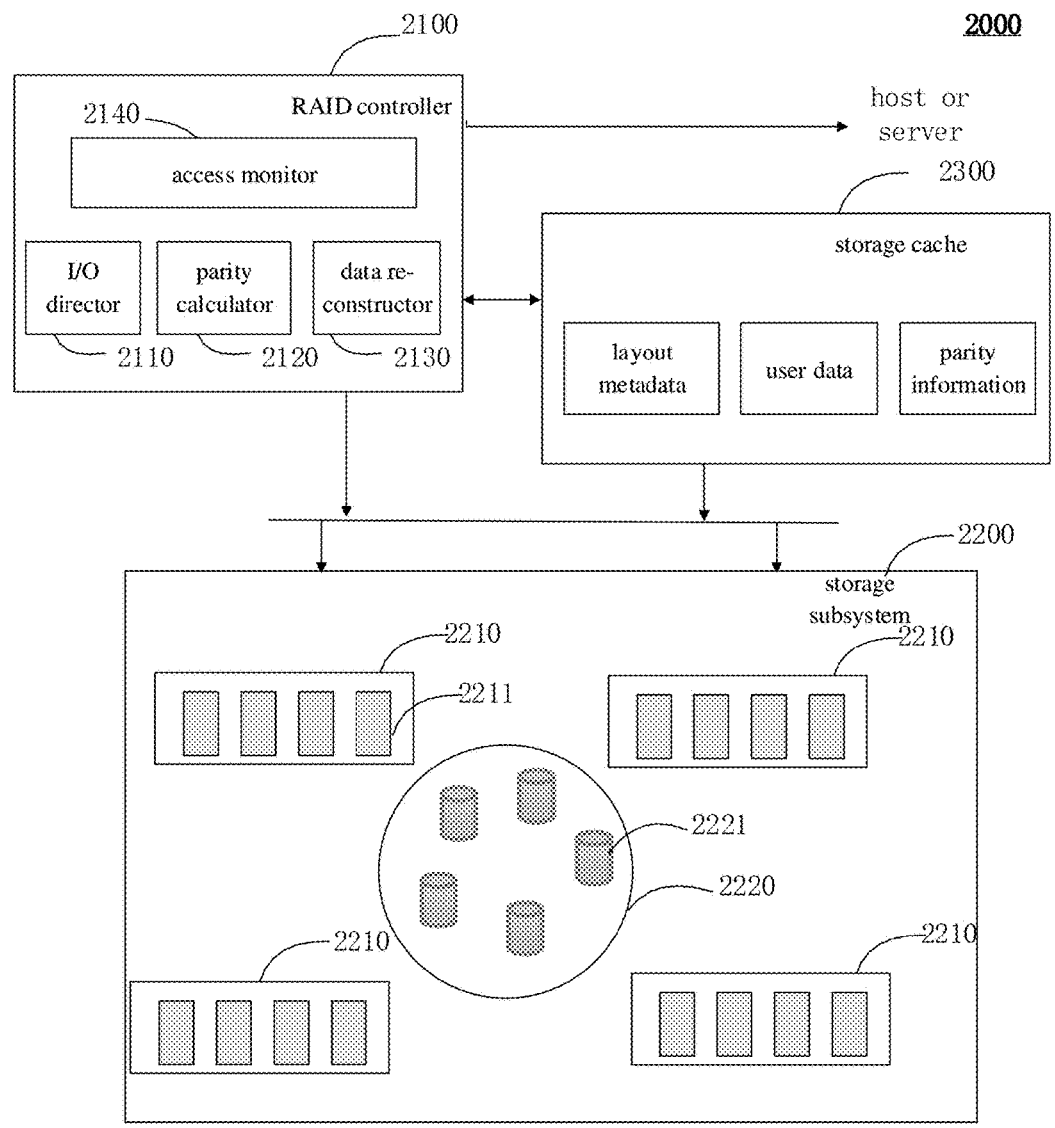
FIG. 2 is the diagram of data storage system 2000 based on the RAID mechanism, implemented according to this invention.

FIG. 2 is the diagram of data storage system 2000 based on the RAID mechanism, implemented according to this invention.

Compared to the first instance of data storage system 1000, the data storage system implemented according to the invention 2000 adds a storage cache 2300, configured to buffer user data, parity information, and layout metadata about data layout. In this example, the first physical storage device 2211 is SSD, and the second physical storage devices 2221 is HDD. Multiple SSDs are used for storing data blocks and multiple HDDs are used for storing parity information. The multiple SSDs are divided into multiple SSD sets that are independent from one another, and data accesses to different SSD sets do not interfere one another.

Each HDD among the multiple HDDs is shared by all SSDs and is able to store parity information of data in any SSD set.

By using the described RAID controller data is stored in each set of first physical storage devices and parity information is stored in multiple shared second physical storage devices, in the RAID mechanism.

In an instance, the data blocks are placed in SSD sets in a round-robin manner.

Because each SSD set is independent from other SSD sets, data accesses to different volumes do not interfere one another. Therefore, it is easy to optimize the access mode to gain better I/O performance.

RAID controller 2100 can consist of an I/O director 2110, a parity calculator 2120, a data re-constructor 2130, and an access monitor 2140.

The I/O director 2110, according to the metadata of data layout, redirects the incoming I/O requests to the corresponding first physical storage devices. The parity calculator 2120 performs parity calculations when request for writes coming, data recovering, or data migrating. The data re-constructor 2130 reconstructs lost data when one or more physical storage devices fail. The access monitor 2140 is responsible for monitoring the I/O accesses of applications, computing the intensity of I/O accesses, and keeping track of the popularity of data in each RAID.

In an instance, when storing or updating data, parity information is written sequentially into each HDD in the form of parallel log writes. The characteristic of the log writes is to simply invalidate original data instead of covering them when updating the data which have been written. When any data block in a stripe of SSD sets is updated, the corresponding parity need to be updated simultaneously. At that time, it can just write the new parity information into a HDD, and invalidate original parity by, for example, modifying the parity log list instead of covering original data. Log writes of parity information can ensure writes in HDD are performed sequentially and avoid the magnetic head seeking back and forth, so as to greatly enhance the speed of writes in HDD. By the way, the write-ahead log structure of HDD parity groups keeps only the latest live version of a parity block, leaving older versions of parity blocks scattered throughout the disk. Such old stuff is called garbage. Data storage system must periodically find these garbage, and clean them to make corresponding blocks on disks free again for the subsequent writes. This operation is called garbage collection. The garbage collection operation can be performed during idle system periods, so that it will not cause additional memory overhead.

The data storage system shown in FIG. 2 allows multiple RAIDs to share parity disk group in a way of statistical time-division multiplexing. Because it rarely happens that all the RAIDs bear write-intensive workloads simultaneously, so data storage system shown in FIG. 2 avoid the possibility that parity accesses become the performance bottleneck of the system.

The data storage system shown in FIG. 2 eliminates the negative influence of frequent parity updates to the lifetime of SSDs in a traditional SSD RAID.

Moreover, in another example, parity disk group 2200 is organized with the RAID mechanism, so data will not be lost even when one SSD in each volume and one HDD fail simultaneously. The data storage system gains a higher level of competence in fault tolerance.

Figure 3:
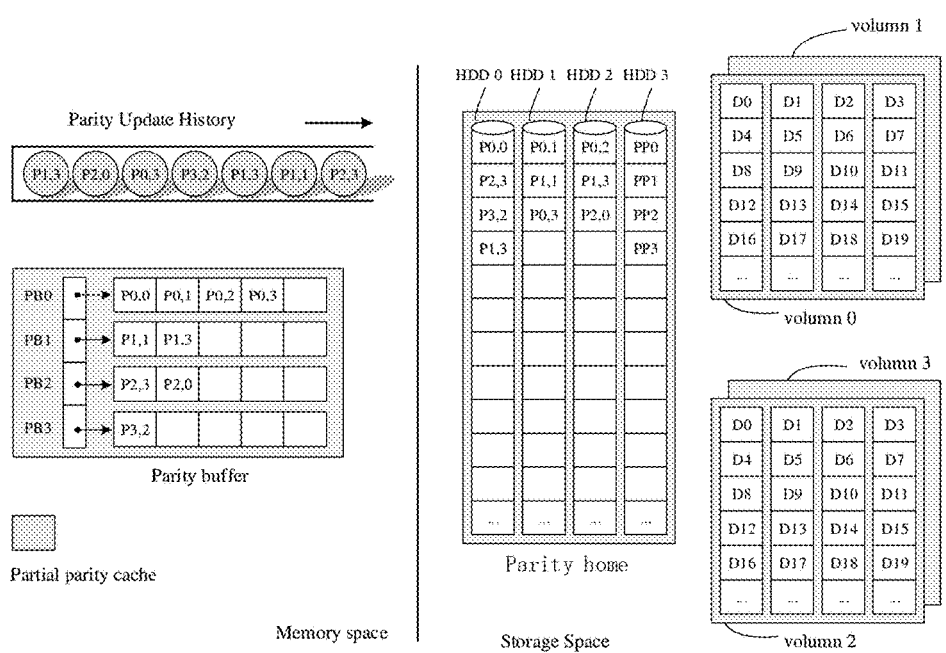
FIG. 3 is an example of the organization of parity and the layout of data in the data storage system shown in FIG. 2.

FIG. 3 illustrates the example of layout of data and organization of parity in data storage system shown in FIG. 2.

In FIG. 3, data volume 0, 1, 2, 3 share a parity home, each data volume consists of four SSDs. Date are written into data volume in form of Round-robin. A parity home is made up of 4 HDDs, among them HDD0, 1 and 2 stores parity information $P_{i,j}$, HDD3 stores the parity of parity information $PP_k$. For example, $PP_0$ stored in HDD3 is the XOR result of $P_{0,0}$ in HDD0, $P_{0,1}$ in HDD1, $P_{0,2}$ in HDD2. $PP_1$ stored in HDD3 is the XOR result of $P_{2,3}$ in HDD0, $P_{1,1}$ in HDD1, $P_{1,3}$ in HDD2. $PP_2$ stored in HDD3 is the XOR result of $P_{3,2}$ in HDD0, $P_{0,3}$ in HDD1, $P_{2,0}$ in HDD2. $PP_3$ stored in HDD3 is the XOR result of $P_{1,3}$ in HDD0. $P_{i,j}$ stands for the parity of Stripe j in Volume i. Parity buffer is shown in memory buffer space. For a Volume i, a parity log list is maintained. For example, as shown in FIG. 3, for Volume 0, items stored in parity log list are items associated with parity $P_{0,0}$, items associated with parity $P_{0,1}$, items associated with parity $P_{0,2}$, items associated with parity $P_{0,3}$. For Volume 1, items stored in parity log list are items associated with parity $P_{1,1}$, items associated with parity $P_{1,3}$. For Volume 2, items stored in parity log list are items associated with parity $P_{2,3}$, items associated with parity $P_{2,0}$. For Volume 3, items stored in parity log list are items associated with parity $P_{1,3}$. In an example, each item in the parity log list is in form of <stripe number, HDD disk number, HDD block number>, where the stripe number indicates the identification of corresponding stripe in data volume protected by that parity, the HDD disk number indicates which HDD the parity of that stripe in data volume is stored in, the HDD block number indicates which block in HDD indicated by the HDD disk number the parity of that stripe in data volume is stored in.

Parity Update History in FIG. 3 shows the parity data updated in chronological order are $P_{2,3}$, $P_{1,1}$, $P_{1,3}$, $P_{3,2}$, $P_{0,3}$, $P_{2,0}$, $P_{1,3}$. By contrast to the parity home, the coming parities are written into each HDD in parallel, and for Stripe 3 in Volume 1, there are two parity corresponding to P1,3 which come one after another, among which the previous parity P1,3 is stored in HDD3 while the parity P1,3 coming later is written into HDD0. So each HDD is written in order.

In an example, there is no read in HDDs unless SSDs or HDDs fail, which reduces the possibility of head leaping addressing in HDDs.

Specifically, for example, once a read request from external such as a storage server arrives, the I/O director first checks whether the target data is in the memory buffer, and if so, it will read the data from the memory buffer. Otherwise, the I/O director forwards this read request to the corresponding set of SSDs according to the layout metadata stored in memory buffer.

Figure 4:
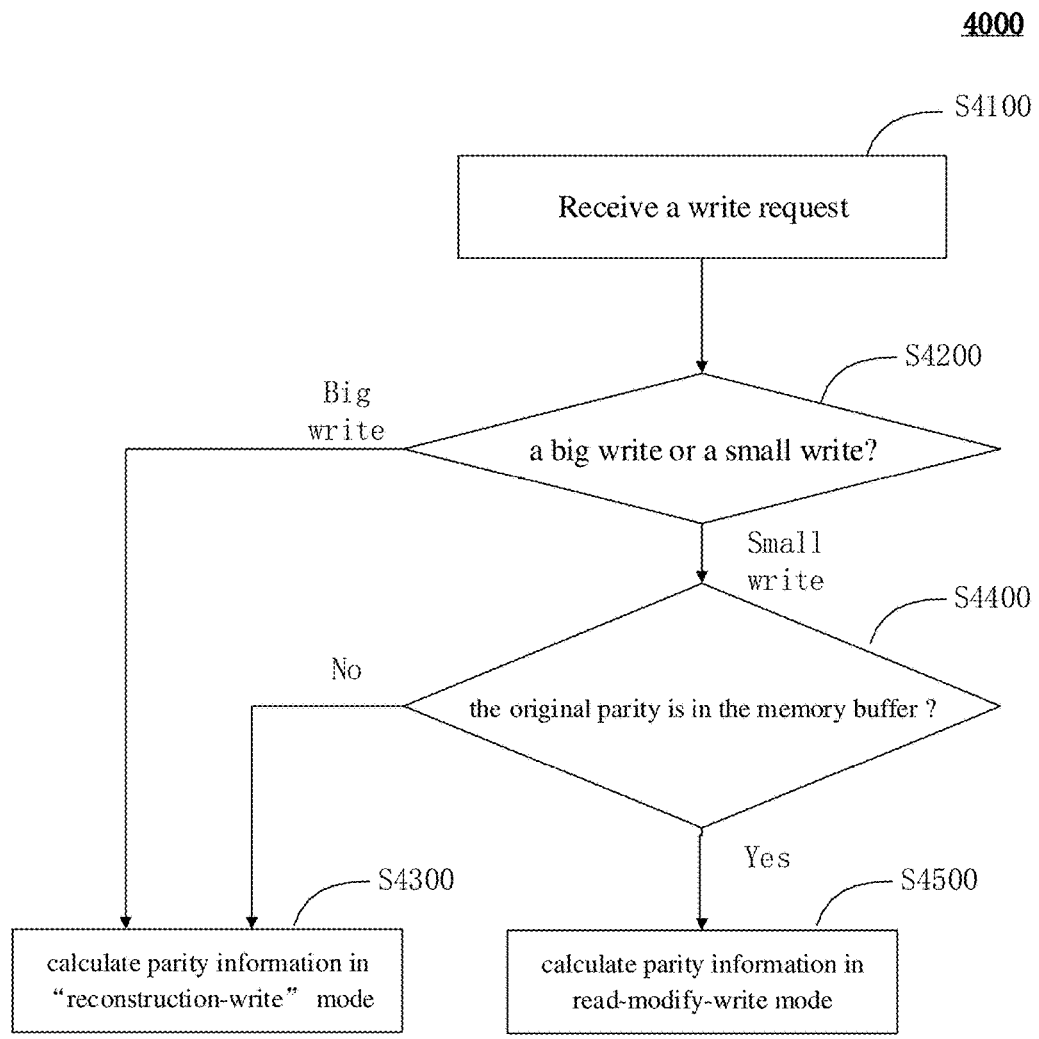
FIG. 4 is the flow chart of parity calculation approach 4000 in the data storage system in accordance with an embodiment of the invention shown in FIG. 2 when receiving a write request.

FIG. 4 illustrates the flow chart of method 4000 of parity calculation performed by the storage system illustrated by FIG. 2 when receiving a write request.

In Step S4100, a write request from external such as a storage server arrives.

In Step S4200, the I/O director first determines whether the request is a big write or a small write. The big write updates data are more than or equal to half all the data in the stripe while the small write updates data are less than half all the data in the stripe. The big write and the small write can also be redefined as desired.

If the request is determined to be a big write, then move to Step S4300, otherwise if the request is determined to be a small write, move to Step S4400.

In Step S4300, the I/O director control the parity calculator to calculate parity information in reconstruction-write mode. As illustrated in an instance, when in reconstruction-write mode, parity are calculated (e.g., by XOR operation) by original data which are read from the segments which need no modification in the target stripe, and new data which need modification in the segment of target stripe. The new segment data are written into relative data SSD volume, and the parity is written into relative HDD volume.

In Step S4400, whether the original parity is in the memory buffer will be determined. If yes, move to Step S4500, the parity calculator calculates parity information in read-modify-write mode, otherwise, if the original parity is not in the memory buffer, then parity calculation is performed in reconstruction-write mode. As illustrated in an instance, read-modify-write mode need to read original parity information and original data in segments that need modification, and combine them with new data in segments need modification to calculate parity (e.g., by XOR operation).

Therefore, in the parity calculation method of data update illustrated by FIG. 4, no matter which calculation method is used, no parity information will be read from the parity home unless SSDs or HDDs fail, so as to reduce the head jumping of HDD parity home and ensure sequential read and write in HDD parity home.

As mentioned above, when a write request is a small write and need to read the current state (i.e., need to read original parity), this embodiment chooses to read original parity from memory cache in which data access is faster than traditionally reading from parity disk, so as to compute parity faster and reduce the random read operation in HDD parity disks.

As mentioned above, HDD party disks adopt log write to ensure sequential writes. The log write structure only saves the latest version of parity block and scatters the old version of parity blocks into different places on the disk. These old version of the data are called garbage. The storage system of this embodiment looks for these garbage and recycles them so that the blocks on the disk become free again for the following write operation, which are called garbage collection.

Since the capacity of an HDD is usually much larger than an SSD, and arbitrarily any of HDDs can be used in the HDD parity home, the garbage collection operations caused by log writes in HDDs can be performed infrequently during system idle periods. Thus, the additional overhead to build the parity home is the memory overhead when constructing the parity mapping list. In one example, the parity mapping list are stored in nonvolatile memory (NVRAM), which is commonly used in storage controllers. When there are multiple blocks in the current stripe to be written, those write operations will be processed in batch. Thus, the parity will be only updated once rather than multiple times.

Data recovery method when data SSDs and/or parity HDDs fail in this invention embodiment will be described with attached Figures as follow.

In an example, when data SSDs and/or parity HDDs fail and need to read in parity HDD, the read operates in order, which is implemented by sorting the entries of association records of parity and data according to the storage address of parity in HDD parity disks.

Specifically, when data SSDs and/or parity HDDs fail, according to the parity mapping list of SSDs, an inverted list for the related HDD is built, in which each entry associates the parity address in HDD with address of related data. Entries in inverted list are sorted by memory address of parity in related HDDs, which enables the sequential HDD read or write when data recover.

Figure 5:
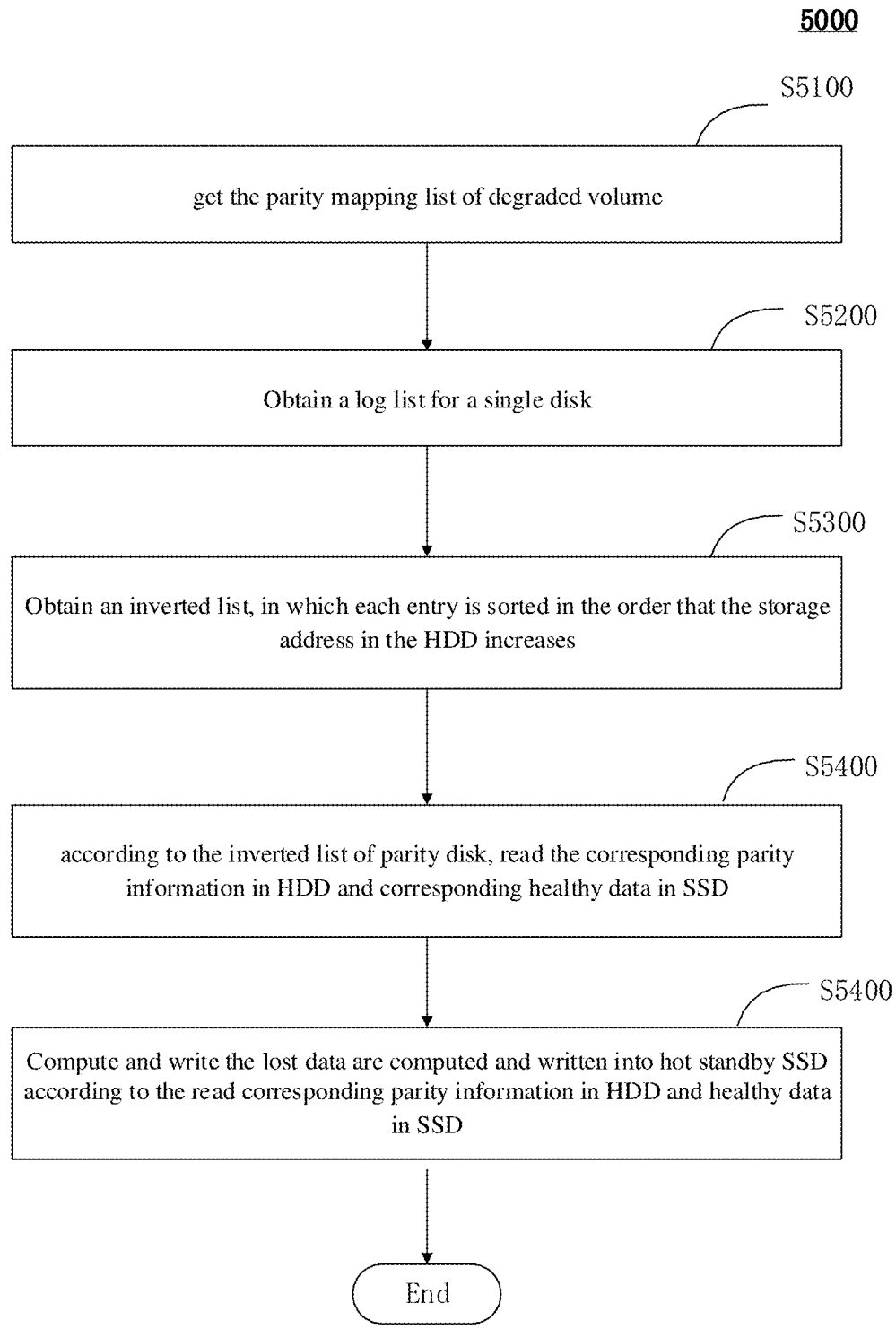
FIG. 5 is the flow chart of data recovery approach 5000 when an SSD fails in accordance with an embodiment of the invention.

FIG. 5 illustrates the acquisition of degraded volume's parity mapping list in Step S5100.

In a storage device, parity mapping list for each volume is preferably maintained in a memory buffer. Entries in the mapping list record stripe number of volume, the disk number and related storage address (such as block number) of parity disk storing parity of that stripe. It should be noted that this invention does not limit the specific form of parity mapping list, any form that can provide volume number, stripe number, parity disk number and information like concrete address in parity disk can be adopted.

In Step S5100, after getting the parity mapping list of degraded volume, move to Step S5200.

In Step S5200, log list for a single disk is obtained.

For example, entries related to parity disk HDD0 extracted from the parity log list of the degraded volume make up of log list L0 of parity HDD0. Each entry of that log list in form of for example, <data stripe number, address in parity disk>, indicates storage address of parity information in related stripe in HDD0. Similarly, entries related to parity HDD1 extracted from parity log list of the degraded volume make up of log list L1 of parity HDD1. In the same way, log lists for HDD2 and HDD3 are obtained respectively.

It should be noted that log list of each parity disk here is associated with the degraded volume and does not involve other data volume.

It should be noted that in Step S5200 and later Steps, each HDD can work independently, so each HDD can work in parallel.

After obtaining log list for each HDD in Step S5200, move to Step S5300.

In Step S5300, the inverted list is obtained, in which each entry is sorted in the order that the storage address in the HDD increases.

Specifically, transform the log list obtained in Step S5200 into an inverted list taking memory address as keyword in form of for example, <storage address in parity disk, stripe number of data volume>, and each entry is sorted according to the storage address.

After getting such an inverted list in which entries are sorted by storage address in HDD, read in HDD can be performed sequentially in that order, which can improve read performance of HDD significantly.

After getting the inverted list of HDD in Step S5300, move to Step S5400.

In Step S5400, according to the inverted list of parity disk, read the corresponding parity information in HDD and corresponding healthy data in SSD.

Specifically, according to each entry in inverted list (e.g., in form of <storage address in parity disk, stripe number in data volume>), read the parity information from the storage address, and read that stripe segment (called healthy data below) from SSDs of related volumes (i.e., SSD sets) excluding failed SSD.

After Step S5400, move to Step S5500.

In Step S5500, the lost data are computed and written into hot standby SSD according to the read corresponding parity information in HDD and healthy data in SSD.

The data recovery of the SSD in a data volume is achieved by performing the above Step S5200-S5500 for all the HDDs (preferably in parallel).

In the data recovery method illustrated in FIG. 5, the inverted list of parity HDD (items in inverted list are sorted in an order that the storage address in the HDD increases) is obtained through parity log list of data volume maintained such as by memory buffer, and then read in HDD can be performed sequentially in such order, which can greatly improve the HDD read performance and avoid the HDD random read performance bottleneck.

It should be noted that, the way to obtain the inverted list is not limited to the Steps illustrated in FIG. 5. For example, items related to a parity disk can be sorted directly when extracted from parity log list according to storage address in parity disk and no need to get a log list of Steps S5200 specially.

Figure 6:
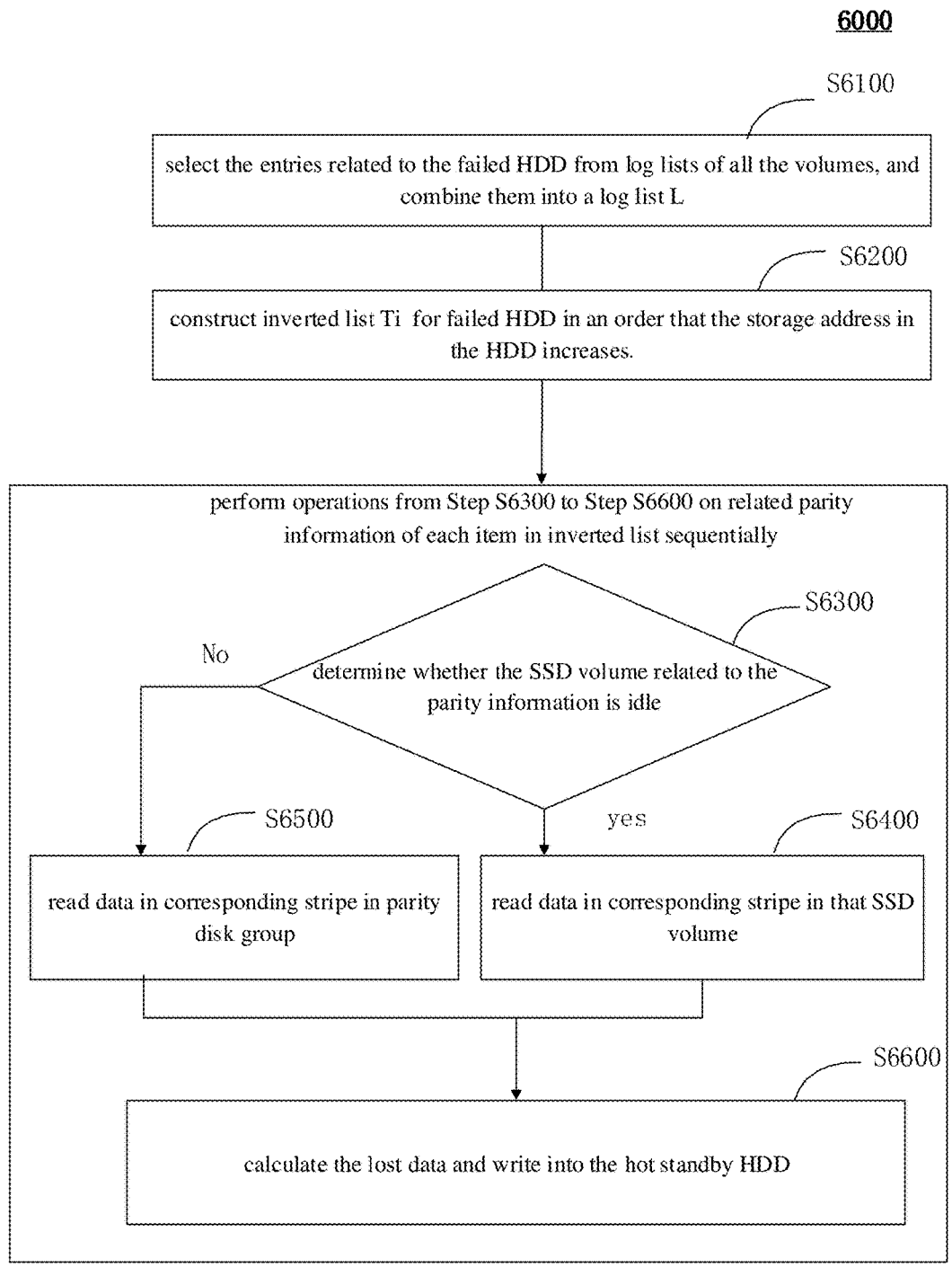
FIG. 6 is the flow chart of data recovery approach 6000 when an HDD fails in accordance with an embodiment of the invention.

FIG. 6 illustrates the flow chart of data recovery method 6000 when a HDD fails according to this invention embodiment.

In Step S6100, the entries related to the failed HDD are selected from log lists of all the volumes, and are combined into a log list L.

In an example, the parity log lists of all the volumes can be combined into a total parity log list, then the parts related to the failed HDD from the total log list are selected to construct a log list.

Each entry of log list associates the data volume number, stripe number and the storage address in HDD, indicates that the parity information in stripe, which is indicated by that stripe number in data volume indicated by that volume number, is stored in the address where the storing address in that HDD indicates. With regard to that storage address, it can be indicated by such as the physical block number in HDD.

Noted that this log list involves all the data volume, as long as the parity information for the stripe of the data volume is stored in the failed HDD.

In Step S6100, after getting the log list related to HDD, move to Step S6200.

In Step S6200, inverted list Ti is constructed for failed HDD in an order that the storage address in the HDD increases.

Construct the inverted list with log lists from Step S6100, for example, take storage address on HDD in each item as a keyword to sort in an Incremental order. Thus, each item in inverted list indicates that data, correlated to parity information in the storage address in the HDD, are stored in the stripe (indicated by the stripe number) in the data volume (indicated by that volume number).

It should be noted that there is no restriction to specific form of each item if information above can be provided.

Next, perform operations from Step S6300 to Step S6600 on related parity information of each item in inverted list sequentially.

In Step S6300, determine whether the SSD volume (indicated by the data volume number) related to the parity information is idle. If the corresponding SSD is idle (YES in S6300), move to Step S6400, and otherwise, the corresponding SSD volume is not idle (NO in S6300), then move to Step S6500.

In Step S6400, read data in corresponding stripe in that SSD volume.

In Step S6500, read data in corresponding stripe (indicated by storage address in HDD) in parity disk group.

After Step S6400 or S6500 finished, move to Step S6600.

In Step S6600, calculate the lost data and write into the hot standby HDD. For example, if the previous Step is S6400, then use data in corresponding stripe in SSD volume obtained from Step S6400 to get the parity information as lost data for recovery by operation like XOR and write to hot standby disk. Otherwise if the previous Step is S6500, then use data in corresponding stripe in parity disk group.

For each item of inverted list, repeat the above Steps from S6300 to S6600, so the data in failed HDD are recovered.

It should be noted that the example shown in FIG. 6 is recovery method that parity disk group is organized by RAID architecture, thus there are Step S6300 and S6500, so that when SSD volume is busy, choose to recover data in failed parity disk using parity disk group itself, trying best to avoid interfering with the normal data read/write operations. But when the parity group disk is not organized by RAID architecture, Step S6300 and S6500 can be removed, and calculate the parity information in HDD directly by reading data in SSD data volume.

The reason for the introduction of the inverted list illustrated in FIG. 6 is that: first, ensure data in other parity disks of corresponding parity disk group read sequentially, second, ensure data written in hot standby disk HDD sequentially, so as to improve read and write performance of parity disk significantly.

Figure 7:
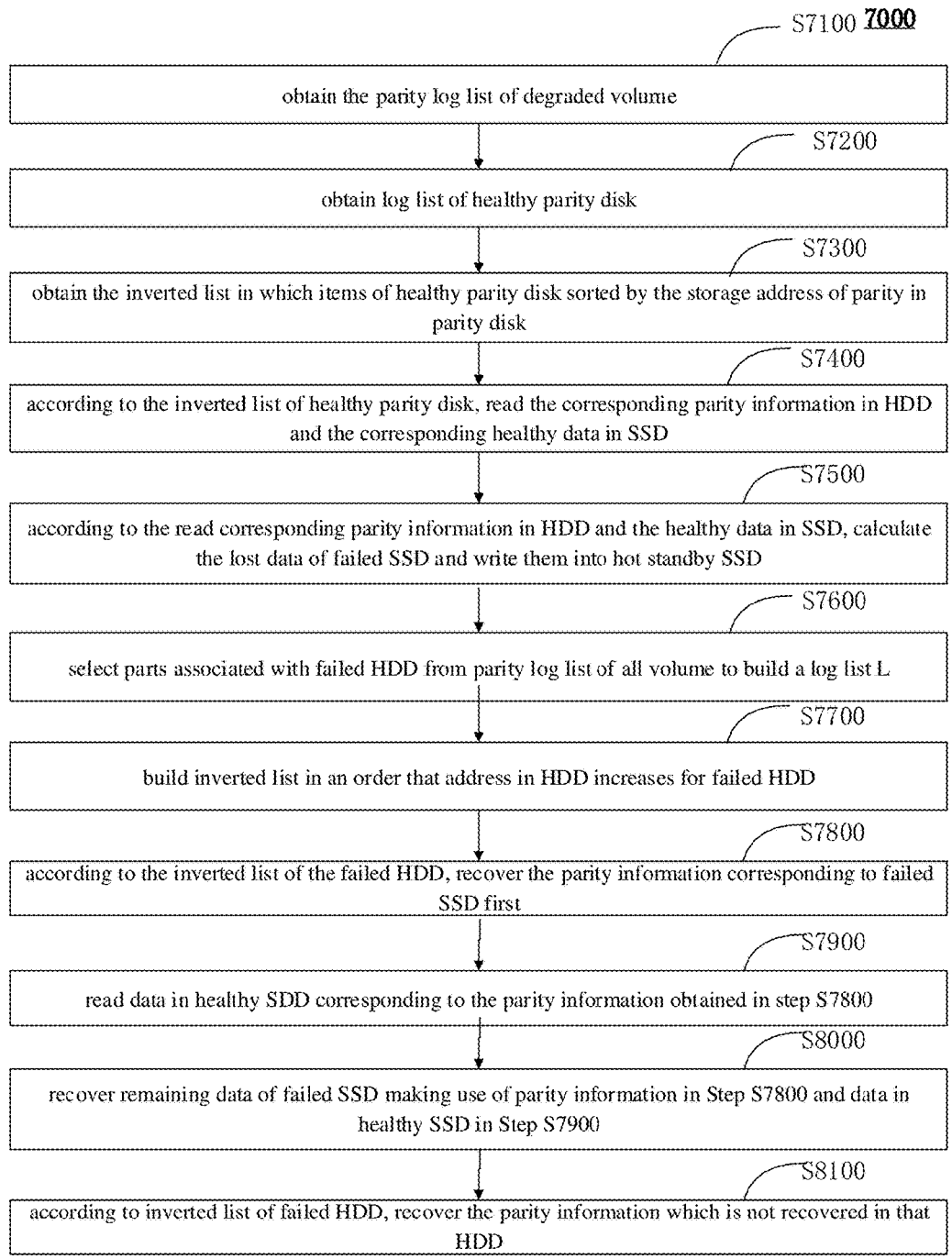
FIG. 7 is the flow chart of data recovery approach 7000 when an SSD and an HDD fail simultaneously in accordance with an embodiment of the invention.

FIG. 7 illustrates the flow chart of data recovery method 7000 when a SSD and a HDD fail simultaneously in accordance with an embodiment of the invention.

The main idea of this invention is to recover data in data disks so as to enable the corresponding data volume working properly as soon as possible.

So, firstly, referring to data recovery method when SSD fails illustrated by FIG. 5, as for a failed SSD, building inverted list for each HDD, then according to inverted list of healthy HDD, recover part of user data stored in failed SSD. Next, referring to data recovery method when HDD fails illustrated by FIG. 6, as for all SSD, build inverted list for failed HDD, then make use of that inverted list, recover parity information corresponding to degraded SSD set in the failed HDD first, then recovering data in failed SSD using the parity information recovered, and repeating this process until the whole recovery for failed SSD finishes. At last, recovering the parity information which is not recovered in failed HDD.

Specifically, as is shown in FIG. 7, Step S7100 to Step S7500 is the SSD recovery method when SSD fails referring to FIG. 5, ruling out failed HDD however. Step S7600 to Step S8100 is same as the recovery method when HDD fails, in addition, it just add Steps for SSD recovery however.

In Step S7100, obtain the parity log list of degraded volume.

In Step S7200, obtain log list of healthy parity disk.

In Step S7300, obtain the inverted list in which items of healthy parity disk sorted by the storage address of parity in parity disk.

In Step S7400, according to the inverted list of healthy parity disk, read the corresponding parity information in HDD and the corresponding healthy data in SSD.

In Step S7500, according to the read corresponding parity information in HDD and the healthy data in SSD, calculate the lost data of failed SSD and write them into hot standby SSD.

Similar to data recovery method of FIG. 5, Step S7200 to S7500 about each HDD (except for the failed HDDs and HDDs storing parity for parity disks) can be executed in parallel.

In Step S7600, select parts associated with failed HDD from parity log list of all volume to build a log list L.

In Step S7700, build inverted list in an order that address in HDD increases for failed HDD.

In Step S7800, according to the inverted list of the failed HDD, recover the parity information corresponding to failed SSD first.

In step S7900, read data in healthy SDD corresponding to the parity information obtained in step S7800.

In Step S8000, recover remaining data of failed SSD making use of parity information in Step S7800 and data in healthy SSD in Step S7900.

In Step S8100, according to inverted list of failed HDD, recover the parity information which is not recovered in that HDD.

Through the failure recovery method shown in FIG. 7, restore the data in failed SSD as fast as possible in order to reduce the impact of data recovery to the normal input/output (I/O) of the application.

Moreover, in the failure recovery method shown in FIG. 7, still ensure the sequential read and write in HDD by constructing inverted list for HDD, which significantly improve the read and write performance of HDD.

Take advantage of the failure recovery method shown in FIG. 7, there is no data loss even when a SSD and a HDD in the storage system fail at the same time, so it provides higher fault-tolerant ability than RAID of traditional SSD.

The structure and quantity of each component (or each step) of the data storage system (or data storage method) mentioned above are not restricted to the scope of the invention. According to an embodiment of this invention, each component part and/or each step can be further combined as an integrated device and/or step to the execute and implement corresponding functions and operations, or each component part and/or each step can be further split into smaller units to realize their respective functions and operations.

The embodiments of the invention have been described above, and the aforementioned description is exemplary and not exhaustive, and is not limited to the disclosed embodiments.

Numerous modifications and variations will be apparent to those ordinary technicians in the field without departing from the scope and spirit of the illustrated embodiments. Therefore, the protection scope of the invention should be determined by the scope of the claims.

The invention claimed is:

1. A storage system based on Redundant Array of Independent Disks (RAID) mechanism, comprising:
    a RAID controller, and
    a storage device subsystem, the storage device subsystem including a plurality of first physical storage devices for data storage and a plurality of second physical storage devices for parity storage,
        wherein the plurality of first physical storage devices are divided into a plurality of sets of the first physical storage devices, each set of the first physical storage devices is independent from the other sets of the first physical storage devices, and data accesses to different sets of the first physical storage devices do not interfere with each other, and the capability of storing parity information of the plurality of second physical storage devices is shared by all the sets of the first physical storage devices, the plurality of second physical storage devices are capable of storing parity information of data in any one of the sets of the first physical storage devices, the RAID controller stores data in each set of the first physical storage devices, and stores parity in the shared plurality of second physical storage devices by the RAID mechanism.

2. The data storage system of claim 1, wherein the first physical storage devices and the second physical storage devices are the same kind of storage devices, or different kinds of storage devices.

3. The data storage system of claim 2, wherein the first physical storage devices and the second physical storage devices are different kinds of storage devices, and in terms of average reading/writing performance, the first physical storage devices is better than the second physical storage devices.

4. The data storage system of claim 1, wherein the first physical storage devices are Solid State Disks (SSD) and the second physical storage devices are Hard Disk Drives (HDD).

5. The data storage system of claim 1, wherein the parity information is written in the second physical storage devices by log writes.

6. The data storage system of claim 1, wherein pieces of parity information for one or more stripes of one or more sets of the first physical storage devices are written into the second physical storage devices through log writes in parallel.

7. The data storage system of claim 6, wherein the parity information is written in each one of the second physical storage devices by sequential writes.

8. The data storage system of claim 1, further comprising a storage cache which is configured to buffer user data, parity information, and layout metadata about the data layout, the RAID controller comprises an I/O director, a parity calculator, and a data reconstructor, among them, the second physical storage devices will not be read unless first physical storage devices or second physical storage devices fail.

9. The data storage system of claim 8, wherein in response to receiving the data read request from outside, I/O director checks whether target data is in the storage cache, if the data is in the storage cache it will get data from the storage cache, otherwise it will redirect the read request to the corresponding set of first physical storage devices according to the data layout metadata stored in the storage cache.

10. The data storage system of claim 8, wherein in response to receiving the data read request from outside, the I/O director judges whether this write request is big write or not;

if the data write request is determined to be a big write request, the I/O director controls the parity calculator to calculate the parity information by the 'reconstruction-write' mode;

if the data write request is determined to be a small write request, the I/O director tries to read old parity of original stripe from the storage cache, and if the old parity is in the storage cache, the parity calculator calculates the parity information by the 'read-modify-write' mode, otherwise the parity calculator calculates the parity information by the 'reconstruction-write' mode.

11. The data storage system of claim 8, when the first physical storage devices and/or the second physical storage devices fail and read operation is needed to be performed on the second physical storage devices, read operations are sequential.

12. The data storage system of claim 1, the plurality of second physical storage devices protect the parity information in the second physical storage devices by RAID-4 mechanism.

13. The data storage system of claim 1, when the first physical storage devices and/or the second physical storage devices fail, the data reconstructor builds an inverted list for each related second physical storage device according to parity mapping table of related sets of the first physical storage devices, each entry in the inverted list associates storage address of parity information in the second physical storage devices with address information of related data, and all the entries in the inverted list are sorted in the increasing order of the address of parity information in the corresponding second physical storage device, so that read or write operations for data recovery to each second physical storage device can be performed sequentially.

14. The data storage system of claim 13, the aforementioned parity mapping table and the inverted list are stored in the storage cache.

15. The data storage system of claim 13, the data reconstructor building an inverted list for each related second physical storage device according to parity mapping table of related sets of the first physical storage devices comprising:

extracting the entries from the parity mapping table of the related set of the first physical storage devices, which are related to the second physical storage device, the entries indicating the addresses, in the second physical storage device, of parity information of data stripes in the related set of the first physical storage devices, sorting the extracted entries in the increasing order of the address in the second physical storage device to get the inverted list.

16. The data storage system of claim 15, wherein read operations on effective parity information on each second physical storage device is performed in parallel.

17. The data storage system of claim 13, wherein when one first storage device in a set of the first physical storage devices fails, the RAID controller is configured to:

for the set of first physical storage devices in which the one first storage device fails, perform the following operations on every second physical storage device to obtain effective parity information:

according to the parity mapping table of the set of the first physical storage devices in which the one first storage device fails, establish by the data reconstructor an inverted list for each second physical storage device, whose entries are sorted in the increasing order of storage address of the effective parity information in the second physical storage device, and every entry in the inverted list associating the address of the data related with the effective parity information in the set of first physical storage devices with the address of the effective parity information in second physical storage devices, and the effective parity information being related with the data stripe in the set of first physical storage devices in which the one first storage device fails, and is stored on the second physical storage device, according to the inverted list in which entries are sorted in the increasing order of storage address of the effective parity information in the second physical storage device, read the effective parity information sequentially from the second physical storage device to recover the data on the failed first physical storage device in the set of first physical storage devices in which the one first storage device fails.

18. The data storage system of claim 13, wherein when a second physical storage device fails, the controller described is configured to, according to parity mapping lists of all sets of the first physical storage devices, obtain by the data reconstructor all the entries related to the failed second physical storage devices from parity mapping lists, and then generate an inverted list sorted by the storage address of effective parity information in the second physical storage devices, in which each entry associates the addresses of data related to effective parity with the storage address of the effective parity in the second physical storage device, the effective parity is stored in the second physical storage devices, and the address of data related to the effective parity involves the set number information of the first physical storage device set, the device number of first physical storage devices in first physical storage device set identified by the set number and specific address information of the first physical storage device identified by the device number, according to the inverted list sorted by the storage address of the effective parity information in the second physical storage device, check by the data reconstructor each entry sequentially, find the set of the first physical storage devices related to the entry and determine whether the first physical storage device set is idle, if so, use by the data reconstructor data in corresponding stripe of corresponding first physical storage device to recover the effective parity in the failed second physical storage device, otherwise use the RAID-4 mechanism related to the failed second physical storage device to recover the effective parity in the failed second physical storage device.

19. A data storage method based on redundant arrays of independent disks (RAID) mechanism, comprising:

providing an RAID controller, providing a plurality of Solid State Drives (SSD) and a plurality of Hard Disk Drives (HDD), wherein the plurality of SSDs are used for storing data, and the plurality of HDDs are used for storing parity information;

the plurality of SSDs are divided into a plurality of SSD sets, each SSD set is independent to each other, and there is no interfere in data access between different SSD sets;

sharing each of the plurality of HDDs by all SSD sets, each of the plurality of HDDs being capable to store parity information of data in any SSD set, by use of the RAID controller, storing data in each SSD with RAID mechanism, and storing parity in the shared plurality of HDDs.

20. A RAID controller, for use together with a storage device subsystem, the storage device subsystem comprising a plurality of first physical storage devices for storing data and a plurality of second physical storage devices for storing parity information of data, the RAID controller performs the following control strategies:

the plurality of first physical storage devices for storing data are divided into multiple sets of physical storage devices, each set of the first physical storage devices is independent from the other sets of the first physical storage devices, and data accesses to different sets of the first physical storage devices do not interfere with each other, and the capability of storing parity information of plurality of second physical storage devices is shared by all the sets of the first physical storage devices, the plurality of second physical storage devices are capable of storing parity information of data in any one of sets of the first physical storage devices, and RAID controller stores data in each set of the first physical storage devices, and stores parity information in the shared plurality of second physical storage devices by RAID mechanism.

* * * * *